US012565979B1

(12) United States Patent
Geppert et al.

(10) Patent No.: US 12,565,979 B1
(45) Date of Patent: Mar. 3, 2026

(54) SYSTEMS AND METHODS FOR A MIRROR ASSEMBLY

(71) Applicant: Methode Electronics, Inc., Chicago, IL (US)

(72) Inventors: Michael Geppert, Bingen (DE); Elie Assy, Mainz (DE)

(73) Assignee: Methode Electronics, Inc., Chicago, IL (US)

( * ) Notice: Subject to any disclaimer, the term of this patent is extended or adjusted under 35 U.S.C. 154(b) by 0 days.

(21) Appl. No.: 19/045,781

(22) Filed: Feb. 5, 2025

(51) Int. Cl.

| | |
|---|---|
| ***F21V 13/04*** | (2006.01) |
| ***F21V 7/10*** | (2006.01) |
| *F21S 41/24* | (2018.01) |
| *F21S 41/36* | (2018.01) |
| *F21S 43/241* | (2018.01) |
| *F21S 43/249* | (2018.01) |
| *F21S 43/31* | (2018.01) |
| *F21W 104/00* | (2018.01) |
| *F21W 106/00* | (2018.01) |
| *F21Y 115/10* | (2016.01) |

(52) U.S. Cl.
CPC ................ *F21V 13/04* (2013.01); *F21V 7/10* (2013.01); *F21S 41/24* (2018.01); *F21S 41/36* (2018.01); *F21S 43/241* (2018.01); *F21S 43/249* (2018.01); *F21S 43/31* (2018.01); *F21S 2243/00* (2024.05); *F21V 2200/00* (2015.01); *F21W 2104/00* (2018.01); *F21W 2106/00* (2018.01); *F21Y 2115/10* (2016.08)

(58) Field of Classification Search
CPC ........ F21V 13/04; F21V 7/10; F21V 2200/00; F21Y 2115/10; F21S 41/24; F21S 41/36; F21S 43/249; F21S 43/31; F21S 43/241
See application file for complete search history.

(56) References Cited

U.S. PATENT DOCUMENTS

| | | | | | |
|---|---|---|---|---|---|
| 4,164,823 | A * | 8/1979 | Marsico | F21S 10/00 359/857 |
| 5,788,579 | A * | 8/1998 | Cherry | F21S 10/00 472/63 |
| 12,259,100 | B1 * | 3/2025 | Park | F21S 43/40 |
| 2022/0003382 | A1 * | 1/2022 | Kim | F21V 14/04 |
| 2022/0373160 | A1 * | 11/2022 | Stephens | H05B 47/155 |
| 2024/0042935 | A1 * | 2/2024 | Herrmann | B60R 1/06 |

* cited by examiner

*Primary Examiner* — Christopher E Dunay
(74) *Attorney, Agent, or Firm* — Foley & Lardner LLP

(57) ABSTRACT

A mirror assembly is described herein. The mirror assembly includes a light guide having a first portion extending along a first axis and a second portion extending along a second axis. The mirror assembly includes one or more light emitting diodes (LEDs) arranged to project light along the first axis, through the first portion of the light guide, and out of the second portion of the light guide. The mirror assembly includes a diffuser arranged proximate to an outer perimeter of the second portion of the light guide, to diffuse light from the LEDs along a surface of the diffuser. The diffuser is at least partially surrounding a first mirrored portion. The mirror assembly includes a lens. The lens includes a second mirrored portion facing the first mirrored portion, where light diffused by the diffuser and reflected by the first mirrored portion and second mirrored portions produces a projected image.

20 Claims, 6 Drawing Sheets

SYSTEMS AND METHODS FOR A MIRROR ASSEMBLY

TECHNICAL FIELD

This application relates generally to mirror assemblies and more particularly to systems and methods of mirror assemblies for lighting applications for vehicles.

BACKGROUND

Various mirrors and displays may be implemented in various settings, use cases, and embodiments, such as in vehicles or automobiles. Additionally, vehicles may have displays which depict various graphics, icons, logos, and the like.

SUMMARY

A first aspect provided herein relates to a mirror assembly. The mirror assembly includes a light guide having a first portion extending along a first axis and a second portion extending along a second axis. The mirror assembly includes one or more light emitting diodes (LEDs) arranged to project light along the first axis, through the first portion of the light guide, and out of the second portion of the light guide. The mirror assembly includes a diffuser arranged proximate to an outer perimeter of the second portion of the light guide to diffuse light from the LEDs along a surface of the diffuser. The diffuser is at least partially surrounding a first mirrored portion. The mirror assembly includes a lens. The lens includes a second mirrored portion facing the first mirrored portion, where light diffused by the diffuser and reflected by the first mirrored portion and second mirrored portions produces a projected image.

A second aspect provided herein relates to a method for manufacturing a mirror assembly. A method includes mounting a light guide into a housing. The light guide includes a first portion extending along a first axis and a second portion extending along a second axis. The method includes mounting one or more light emitting diodes (LEDs) proximate the light guide, where the LEDs are mounted to project light along the first axis, through the first portion of the light guide, and out of the second portion of the light guide. The method includes positioning a diffuser proximate to an outer perimeter of the second portion of the light guide to diffuse light from the LEDs along a surface of the diffuser. The diffuser is at least partially surrounding a first mirrored portion. The method includes mounting a lens proximate the diffuser. The lens includes a second mirrored portion facing the diffuser and the first mirrored portion, where light diffused by the diffuser and reflected by the first mirrored portion and second mirrored portions produces a projected image.

A third aspect provided herein relates to a mirror assembly system. A mirror assembly system includes a mirror assembly. The mirror assembly includes a light guide having a first portion extending along a first axis and a second portion extending along a second axis. The mirror assembly includes one or more light emitting diodes (LEDs) arranged to project light along the first axis, through the first portion of the light guide, and out of the second portion of the light guide. The mirror assembly includes a diffuser arranged proximate to an outer perimeter of the second portion of the light guide, to diffuse light from the LEDs along a surface of the diffuser. The diffuser is at least partially surrounding a first mirrored portion. The mirror assembly includes a lens. The lens includes a second mirrored portion facing the first mirrored portion. The mirror assembly system further includes a controller configured to control the LEDs to project the light along the first axis to produce a projected infinite image when the light is diffused by the diffuser and reflected by the first mirrored portion and the second mirrored portion.

BRIEF DESCRIPTION OF THE DRAWINGS

These and other aspects and features of the present embodiments will become apparent to those ordinarily skilled in the art upon review of the following description of specific embodiments in conjunction with the accompanying figures.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Referring to the FIGURES, systems and methods described herein may be configured, designed, or otherwise arranged to create a mirror assembly. The mirror assembly may be configured to produce projected images to create the illusion of an infinite tunnel. In some embodiments, the mirror assembly may facilitate increased light intensity, uniformness, and color mixing of the projected images via a light guide. In some embodiments, the mirror assembly may facilitate color mixing of RGB-LEDs via the light guide. In some embodiments, a mirror assembly system may promote color mixing and therefore allow the system to adjust intensity of the individual LEDs and correspondingly adjust the color of the projected image.

Figure 1:
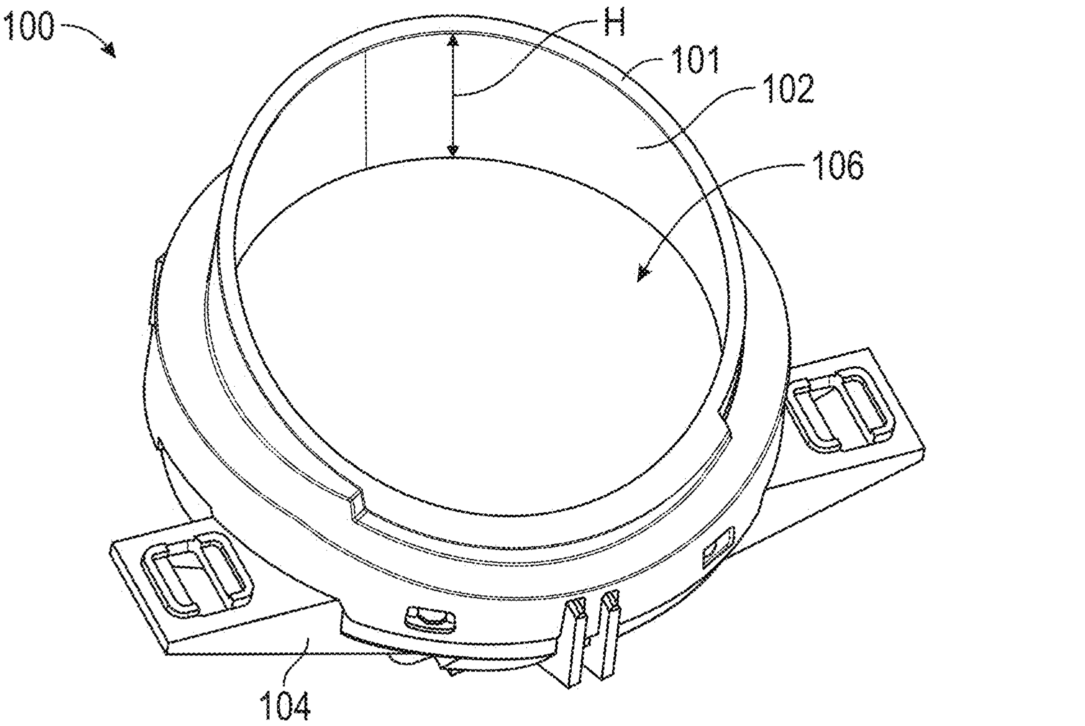
FIG. 1 is a perspective view of a mirror assembly, according to an exemplary embodiment.

Referring now to FIG. 1, depicted is a perspective view of a mirror assembly 100. In some embodiments, the mirror assembly 100 may be used for lighting enhancement of automotive vehicles. For example, the mirror assembly 100 may be coupled to or incorporated in various types of vehicles including, but not limited to, coupes, sedans, convertibles, sport utility vehicles (SUVs), crossovers, hatchbacks, station wagons, minivans, trucks, and/or various other types or forms of vehicles. In some embodiments, the mirror assembly 100 may be incorporated into a taillight or headlight configuration, or in an emblem of the vehicle. In some embodiments, the mirror assembly 100 may be implemented in interior components of a vehicle including, but not limited to, dashboard panels and center consoles.

The mirror assembly 100 may include a housing 101 including an upper housing 102 (or upper housing portion) and a lower housing 104 (or lower housing portion), and a lens 106. The upper housing 102 may be configured to shape and/or direct the emitted light from the mirror assembly 100. The lower housing 104 may be configured to secure and retain internal components of the mirror assembly 100 post installation (e.g., in a vehicle or other setting). As described in greater detail below, the mirror assembly 100 may include various mirrors (e.g., internal mirrors and/or mirrored surface(s) of the lens 106) which are arranged and/or configured to reflect light from one or more light emitting diodes (LEDs) and direct the light through the mirror assembly 100 via a light guide and diffuser, in multiple iterations, to create an illusion of an infinite projected image (e.g., a series of rungs or a tunneling effect according to the shape of the diffuser).

Figure 2:
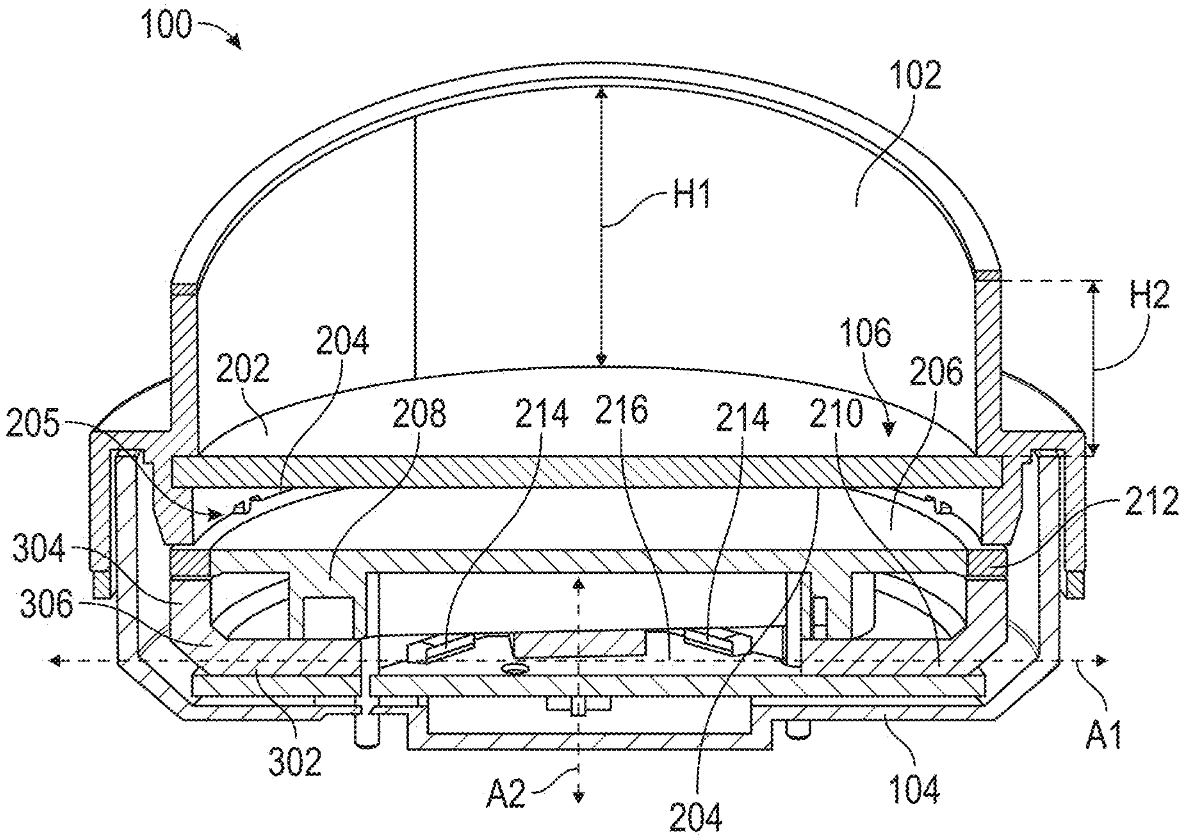
FIG. 2 is a cross-sectional side view of the mirror assembly, according to an exemplary embodiment.
Figure 3:
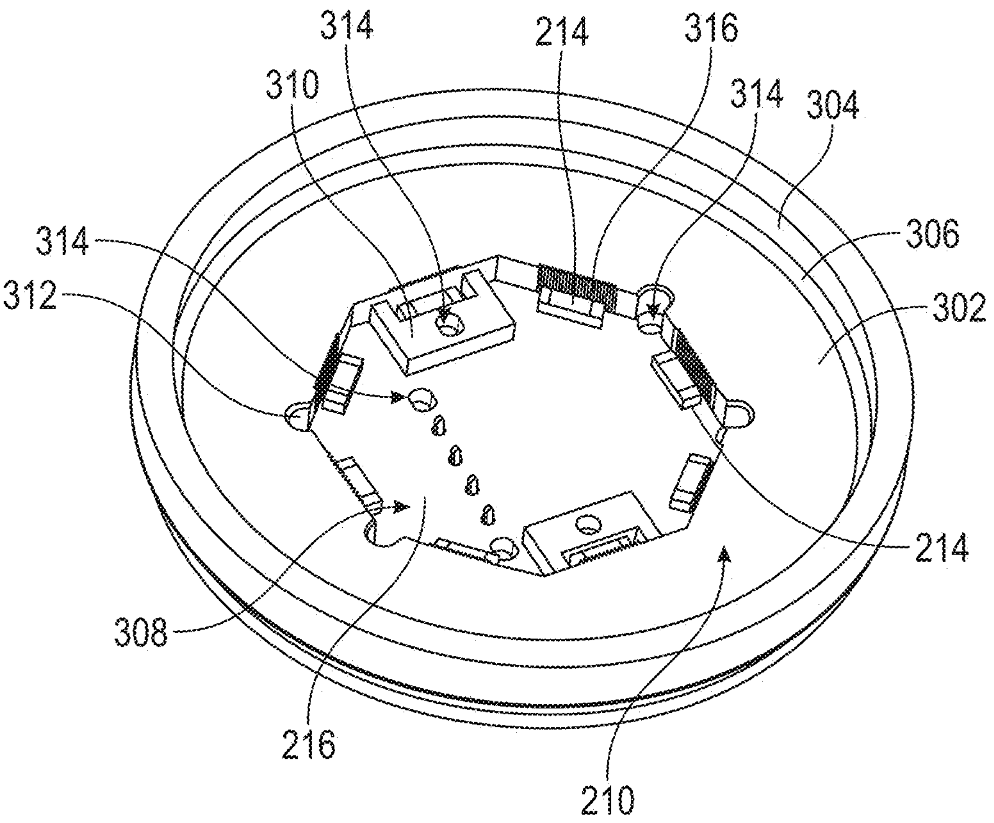
FIG. 3 is a perspective view of a light guide and LED configuration of the mirror assembly, according to an exemplary embodiment.

As shown in FIG. 1-3, the lower housing 104 may extend along (e.g., parallel with) a first axis A1 (e.g., laterally). The upper housing 102 may extend along (e.g., parallel with) a second axis A2 (e.g., vertically). In some embodiments, the upper housing 102 may extend along the second axis A2 beyond the lens 106. The upper housing 102 may include a height H that varies about a perimeter of the lens 106. For example, as best shown in FIG. 2, the upper housing 102 may include a first height H1 and a second height H2, where the first height H1 is greater than the second height H2. As another example, the upper housing 102 may include a first height H1 and a second height H2, where the second height H2 is greater than the first height H1. As still another example, the upper housing 102 may include a first height H1 and a second height H2, where the first height H1 is equal to the second height H2. As still another example, the upper housing 102 may include a first height H1, a second height H2, and various additional heights to form a desired styling shape. The upper housing 102 may be designed or configured to shape the emitted light and direct emphasis on the projected image produced by the mirror assembly 100. The lower housing 104 may enclose internal components of the mirror assembly 100 including the mirror 206, light guide 210, diffuser 212, LEDs 214, and base plate 216. The lower housing 104 may include through holes configured to allow fasteners to secure the internal components of the mirror assembly. As shown in FIGS. 2 and 3, the base plate 216 may secure the light guide 210 and LEDs 214 within the lower housing 104. In some embodiments, the upper housing 102 may be coupled to the lower housing 104, via various fasteners or coupling mechanisms, such as but not limited to various screws or bolts, press fitting, welding, clamps, threaded coupling, adhesives, or any other fastening or coupling mechanisms.

As shown in FIGS. 1-3, the mirror assembly 100 may include a lens 106. The lens 106 may have an upper surface 202 (e.g., towards the upper housing 102) and a lower surface 204 (e.g., towards the lower housing 104). The lens 106 may be constructed of glass or acrylic material and feature a transparent/translucent side (e.g., on the upper surface 202, also referred to herein as transparent side 202) and a reflective/mirrored side (e.g., on the lower surface 204, also referred to herein as reflective side 204). The transparent side 202 may enable/facilitate light passing through the lens 106 and into an interior portion of the mirror assembly 100. The reflective side 204 may at least partially reflect some light inside the interior portion of the mirror assembly 100 (e.g., back towards a mirror 206, described below). The reflective side 204 may have a reflective coating including various materials and/or layers of materials such as, but not limited to, metals, metal oxides, and/or similar compositions. The reflective side 204 may include a metal foil. In some embodiments, the transparent side 202 of the lens 106 displays, includes, or otherwise has provided thereon one or more images (image 504 of FIG. 5B) which is viewable to an observer. In some embodiments, the image(s) may include alphanumeric text or pictorial images/graphics, such as a logo. The image(s) may be adhered to, affixed on, or etched into the transparent side 202 of the lens 106. In some embodiments, the image(s) may be part of the lens 106. In some embodiments, the image(s) may be formed by various processes such as milling, lasering, and/or similar processes.

As shown in FIGS. 2 and 3, the mirror assembly 100 may include a mirror 206, which together with the lens 106, define an interior portion 205 of the mirror assembly 100. The mirror 206 may face the reflective side 204 of the lens 106. The mirror 206 may be affixed or maintained within the housing 101 via a protrusion 208, which may stabilize the mirror 206 within the housing 101. The protrusion 208 may include a tab, a male/female coupling (e.g., with respect to the light guide 210 described below), or any other interface/coupling mechanism designed or configured to couple and retain the mirror 206 within the housing 101.

The mirror assembly 100 may include a light guide 210, a diffuser 212, and LEDs 214. The light guide 210 may be positioned and otherwise fixed within the lower housing 104, proximate to the LEDs 214 and the diffuser 212. The light guide may be constructed of various materials, such as but not limited to acrylic, polycarbonate, glass silicone, polyethylene terephthalate, or other similar materials to direct and control the transmission of light from the LEDs 214 toward the diffuser 212. In some embodiments, the mirror assembly 100 may include more than one light guide to direct light emitted from the LEDs 214 to the diffuser 212. In some embodiments, the shape of the light guide 210 may be dictated by a desired image design, styling shape, and/or light simulation.

Referring to FIG. 3, with continued reference to FIG. 2, the light guide 210 may include a first portion 302 extending along (e.g., parallel with) the first axis A1 (e.g., laterally) and a second portion 304 extending along (e.g., parallel with) the second axis A2 (e.g., vertically), as shown in FIG. 2 and FIG. 3. In some embodiments, the first portion may include a flat surface, whereas the second portion may include a curved surface. In some embodiments, the first portion 302 (e.g., an interior face) may include a tab which is configured to receive the protrusion 208 of the mirror 206, to couple the mirror 206 to the light guide 210. The second portion 304 may be configured to direct light from the LEDs 214 to an illuminated feature or area (e.g., the diffuser 212). The first portion 302 and the second portion 304 may be connected to one another via a transition portion 306. As best shown in FIG. 2, the transition portion 306 may extend at an angle with respect to the first axis A1 and the second axis A2 (e.g., with substantially flat upper and lower surfaces. While this arrangement is shown, in various embodiments, the transition portion 306 may have arcuate upper and lower surfaces to transition from the first portion 302 and the second portion 304.

Referring specifically to FIG. 3, the light guide 210 may include an aperture 308 formed within the first portion 302 and defined by interior walls of the first portion 302. In some embodiments, the aperture 308 may have a hexagonal shape, though other shaped apertures may be formed within the first portion 302 to accommodate various components or elements therein. The aperture 308 may include various features (such as protrusions 310, slots 312, and apertures 314) which are arranged or configured to receive various coupling elements, such as fasteners, clips, and the like, to secure the light guide 210 to the lower housing 104 of the mirror assembly 100. The first portion 302 may include ribbed portions 316 along the interior walls of the first portion 302. The ribbed portions 316 may be configured to receive and disburse/distribute/refract light from the LEDs 214 along the first portion 302. In some embodiments, the first portion 302 may not include ribbed portions 316. It should be understood that the design and orientation of the light guide 210 as described in the present disclosure should not be limited to the design and orientation as shown in FIG. 3.

As shown in FIGS. 2 and 3, the mirror assembly may include a diffuser 212. The diffuser 212 may be ring-shaped and positioned around the circumference of the mirror 206. The diffuser 212 may additionally interface with the upper perimeter of the light guide 210 along the second portion 304. The diffuser 212 may be constructed of various materials, such as but not limited to translucent plastic or resin, acrylic, polycarbonate, or similar materials. The diffuser 212 may be configured to scatter, distribute, or otherwise diffuse light emitted from the LEDs 214 along the diffuser 212. The diffuser 212 may diffuse the light along an outermost surface (e.g., along the second axis A2) opposite the second portion 304 of the light guide 210) to create a soft, continuous illumination along the diffuser 212.

As shown in FIGS. 2 and 3, the mirror assembly 100 may include at least one or more LEDs 214. The LEDs 214 may be arranged, positioned, or otherwise configured to direct light towards the ribbed portions 316 of the first portion 302 (e.g., formed in the interior walls of the first portion 302 adjacent the LEDs 214). The LEDs 214 may include red green blue (RGB) LEDs, RGB-white (RGB-W) LEDs, or any other type/form combination of colored LEDs. Additionally, while LEDs 214 are described, the mirror assembly 100 may include other types or forms of light sources configured or capable of producing light having a range of colors. The LEDs 214 may facilitate color mixing, in which adjusting the intensity of individual LEDs 214 correspondingly adjusts the color output of the mirror assembly system. In various embodiments, sets of LEDs 214 may be positioned around the aperture 308 to create substantially uniform illumination by reducing shadows and hot spots (e.g., bright areas). In some embodiments, the LEDs 214 may be positioned below a printed circuit board (PCB), in which the light guide 210 may serve as a mechanism for allowing the entrance of light and guiding the light through the mirror assembly. It should be understood that the positioning and orientation of the LEDs 214 as described in the present disclosure should not be limited to the orientation as shown in FIG. 2 and FIG. 3.

Figure 4:
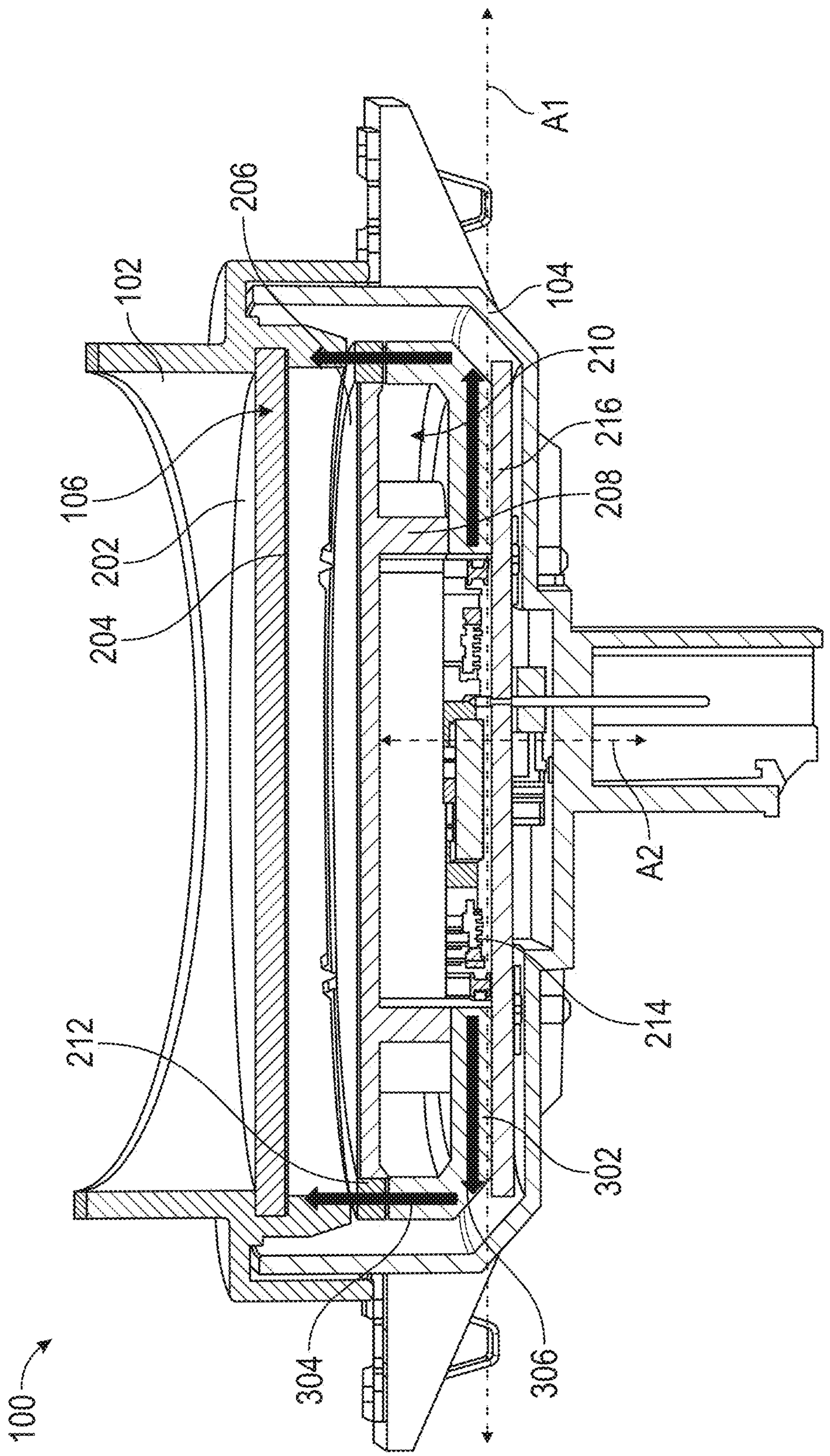
FIG. 4 is a cross-sectional side view of light travel from LEDs within the mirror assembly in operation, according to an exemplary embodiment.
Figure 5A:
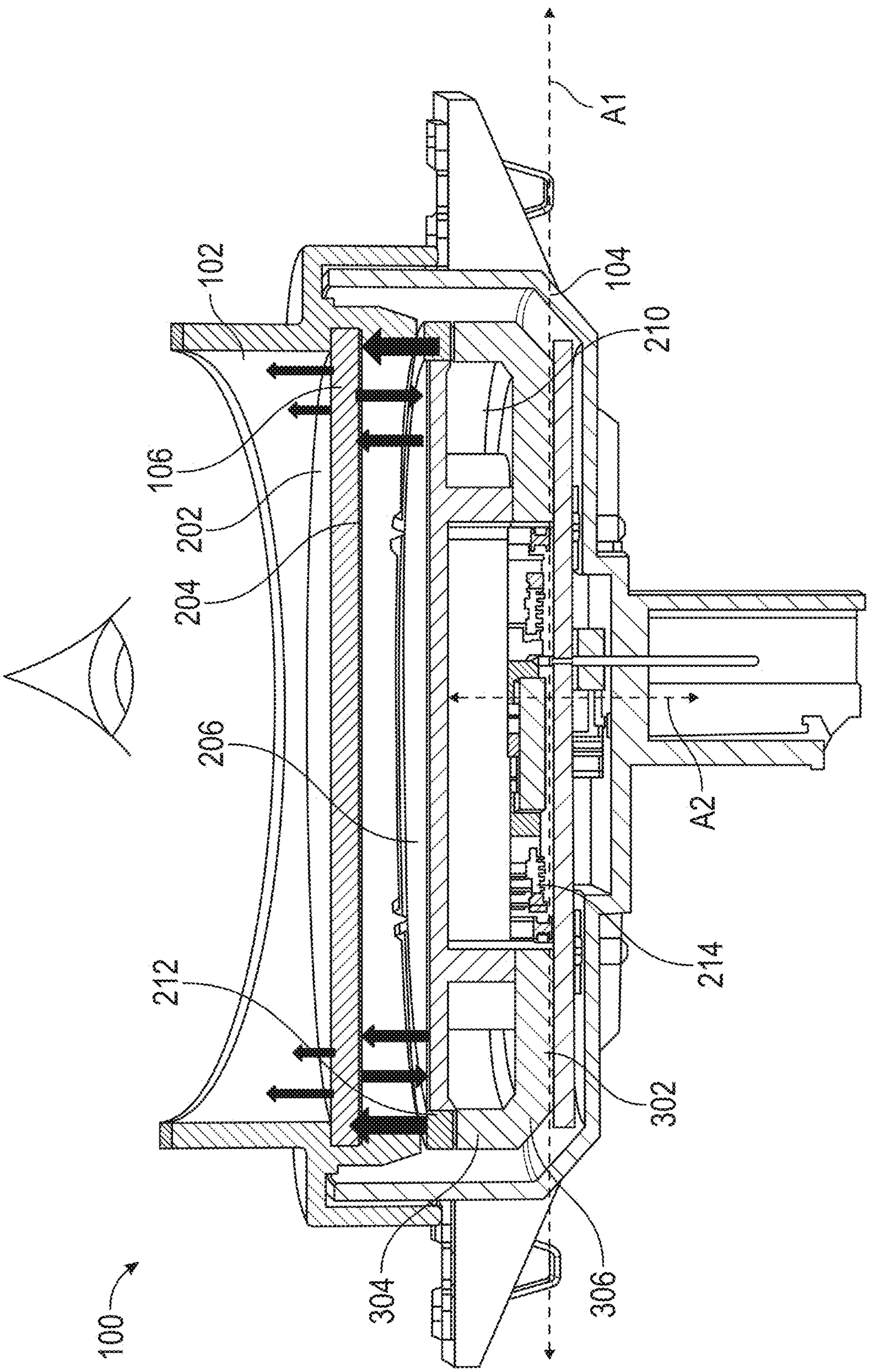
FIG. 5A is a cross-sectional side view of light travel to an observer from the mirror assembly in operation, according to an exemplary embodiment.
Figure 5B:
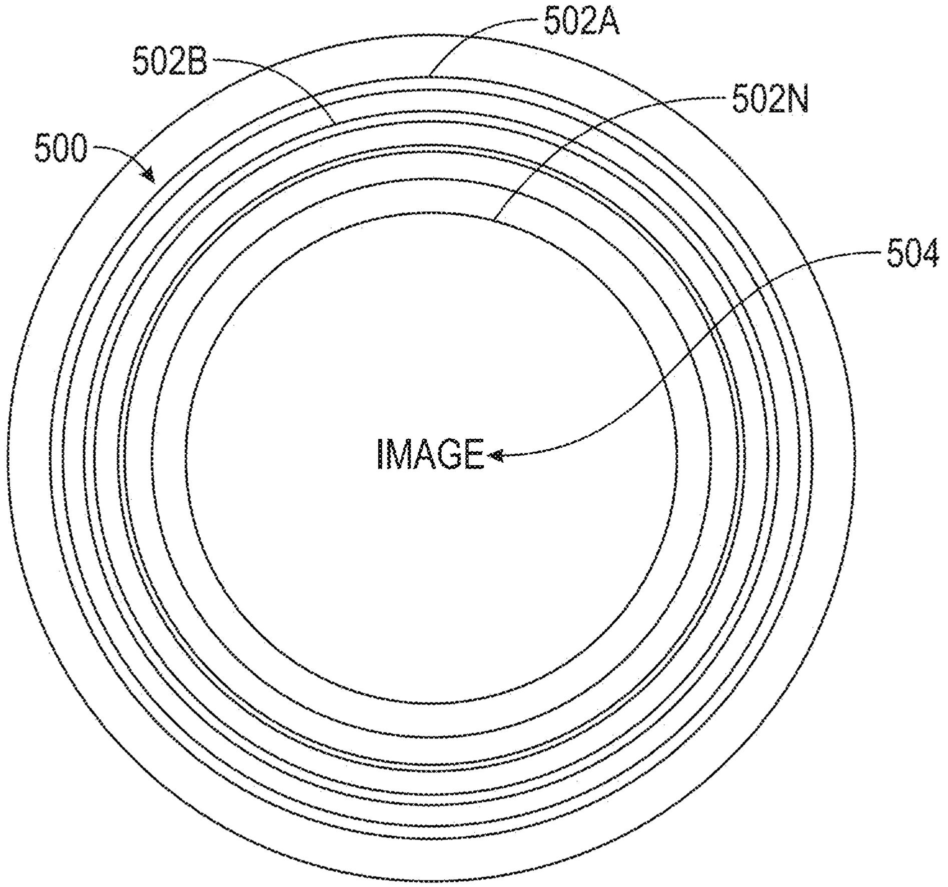
FIG. 5B is a view of a projected image that may be produced by the mirror assembly of FIG. 1-FIG. 3 in operation, according to an exemplary embodiment.

Referring now to FIG. 4 through FIG. 5B, and in operation, the configuration of the mirror assembly 100 may create a projected image 500 which forms an "infinite" tunnel of rungs 502 (502A-502N) surrounding an image 504 formed in or provided on the upper surface 202 of the lens 106, as shown in FIG. 5B. Specifically, as shown in FIG. 4, the LEDs 214 may direct emit and direct light into the ribbed portions 316 of the first portion 302 of the light guide 210, which may distribute/scatter/disburse the light along the first portion 302 of the light guide 210 (e.g., along/parallel to the first axis A1), as shown by the arrow extending axially through the first portion 302 of the light guide 210 in FIG. 4. The light may then traverse through the transition portion 306 of the light guide 210, and through the second portion 304 of the light guide to the diffuser 212, as shown by the arrow extending vertically (e.g., along/parallel to the second axis A2) towards the diffuser. In some embodiments, additional light may be extracted from other areas of the mirror assembly 100 and directed laterally along the first axis A1 with light from the LEDs 214. For example, the other areas may include the regions between the protrusion 208 of the mirror 206 and the second portion 304 of the light guide 210. In some embodiments, additional light may be extracted with additional diffusers or light extraction elements. The diffuser 212 may diffuse light along an outermost surface of the diffuser 212, to form the first rung 502A of the projected image 500 shown in FIG. 5B. As shown in FIG. 5A, the additional rungs (502B-502N) of the "infinite" tunnel may be formed by the reflection of light between the reflective side 204 of the lens 106 and the mirror 206.

As shown in FIG. 5B, the shape of the diffuser 212 may define a shape of the rungs 502 of the projected image 500. In FIG. 5B, the rungs 502 may be or include concentric rings. It should be understood that other shapes of diffusers 212 may be used or implemented in the mirror assembly 100, to produce different shaped rungs 502 of the projected image 500. As an example, the rungs 502 of the projected image 500 may include geometries such as, but not limited to, interrupted rungs, ovals, geometric polygons, irregular contours, or similar geometries.

As shown in FIG. 5B, the width of the diffuser 212 may define a thickness of the rungs 502 of the projected image 500. As an example, a wide diffuser may produce thicker rungs 502 of the projected image 500. As another example, a narrow diffuser may produce thinner rungs 502 of the projected image 500. It should be understood that other shapes of diffusers 212 may be used or implemented in the mirror assembly 100, to produce rungs 502 of the projected image 500 of various thicknesses.

As shown in FIG. 5A and FIG. 5B, the intensity may decrease from the first rung 502A to the innermost visible rung 502N, as the emitted light from the diffuser 212 reflects repeatedly between the reflective side 204 and the mirror 206. During this process, each subsequent reflection appears smaller/less intense/faded, due to a portion of the light being transmitted through the lens 106. This is demonstrated through the arrows emerging from the mirror assembly 100 towards the observer in FIG. 5A and difference in intensity/thickness of the rungs 502 in FIG. 5B. As a result, the illusion of concentric rungs 502 that extend infinitely may be produced and surround the image 504.

In some embodiments, the position of the lens 106 (e.g., the reflective side 204 of the lens 106) and the mirror 206 may dictate, define, or otherwise configure the distance between the rungs 502. The distance between the reflective side 204 of the lens 106 and the mirror 206 may correlate to the distance between the first rung 502A and the second rung 502B (and correspondingly, the second rung 502B to the next rung and so forth). In other words, the interior portion 205 and the mirror 206 may be separated by a first distance, and the rungs 502 may be separated by a second distance. The first and second distance may have a proportional relationship, such that the second distance increases when the first distance is correspondingly increased.

Figure 6:
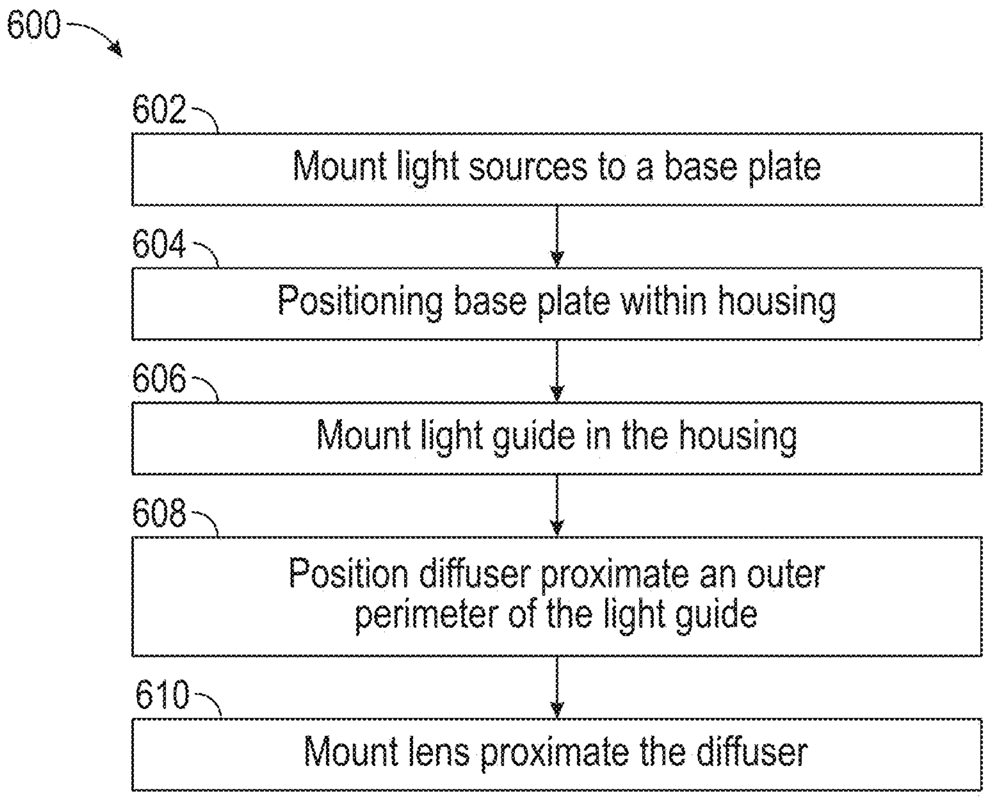
FIG. 6 is a flowchart of a method for manufacturing a mirror assembly, according to an exemplary embodiment.

Referring now to FIG. 6, depicted is a flowchart showing an example method 600 of manufacturing the mirror assembly 100.

At act 602, one or more light sources (such as light emitting diodes (LEDs)) may be mounted to a base plate. The base plate may be or include a circuit board communicably coupled to a controller. The light sources may be arranged/coupled/fixed/coupled to the base plate, to direct light laterally along a first axis.

At act 604, the base plate may be positioned within a housing. The housing may include an upper and lower portion of the housing. The base plate may be positioned within the lower portion of the housing. In some embodiments, the base plate may be positioned in an orientation within the lower portion of the housing, such that various features of the base plate (e.g., apertures/holes/tabs) align with corresponding features in the lower portion of the housing.

At act 606, a light guide may be mounted within the housing. In some embodiments, the light guide may be mounted within the housing, by positioning the light guide at least partially over the base plate. The light guide may be positioned such that a first portion of the light guide (e.g., extending axially along the first axis) is positioned proximate to the LEDs of the base plate. In particular, the light guide may be positioned relative to the base plate, such that the LEDs are arranged to direct light towards one or more ribbed portions along an interior wall of the first portion of the light guide (e.g., facing the LEDs). The light guide may be mounted within the housing, by fastening the light guide to the lower portion of the housing with the base plate secured and arranged at least partially intermediary to the light guide and the lower portion of the housing. The light guide may be fastened to the lower portion of the housing via one or more fastening means, such as a screw or bolt, press fitting, adhesives, screwing/threading coupling, etc.

At act 608, the diffuser may be positioned proximate to the light guide. In some embodiments, the diffuser may be positioned proximate to an outer perimeter of a second portion of the light guide (e.g., extending vertically along a second axis perpendicular to the first axis). The diffuser may be arranged to receive and diffuse light from the LEDs along a surface of the diffuser. For example, the diffuser may be arranged to receive light which is transmitted by the LEDs to the ribbed portion of the first portion of the light guide, transmitted axially along the first portion the light guide and vertically along the second portion of the light guide.

In some embodiments, a mirror may be positioned and fastened within the housing above the base plate and light guide. For example, the mirror may be clipped or otherwise retained within the housing via an interface between the light guide and a tab or protrusion of the mirror. The diffuser may be arranged along a perimeter of the mirror, proximate to the light guide.

At act 610, a lens may be mounted proximate the diffuser. In some embodiments, the lens may be mounted by positioning the lens within a slot of the lower housing portion and coupling the upper housing portion to the lower housing portion. In some embodiments, the lens may be or include a one-way mirror, having a reflective surface or side and a transparent/translucent surface or side. The lens may be mounted such that the reflective surface/side faces the mirror (e.g., around which the diffuser may be positioned), and the transparent/translucent side faces an observer. The lens may be mounted relative to the mirror, to promote the light diffused by the diffuser and reflected by the first mirrored portion (e.g., the reflective side of the lens) and second mirrored portion (e.g., the reflective surface of the mirror) to produce a projected infinite image.

Figure 7:
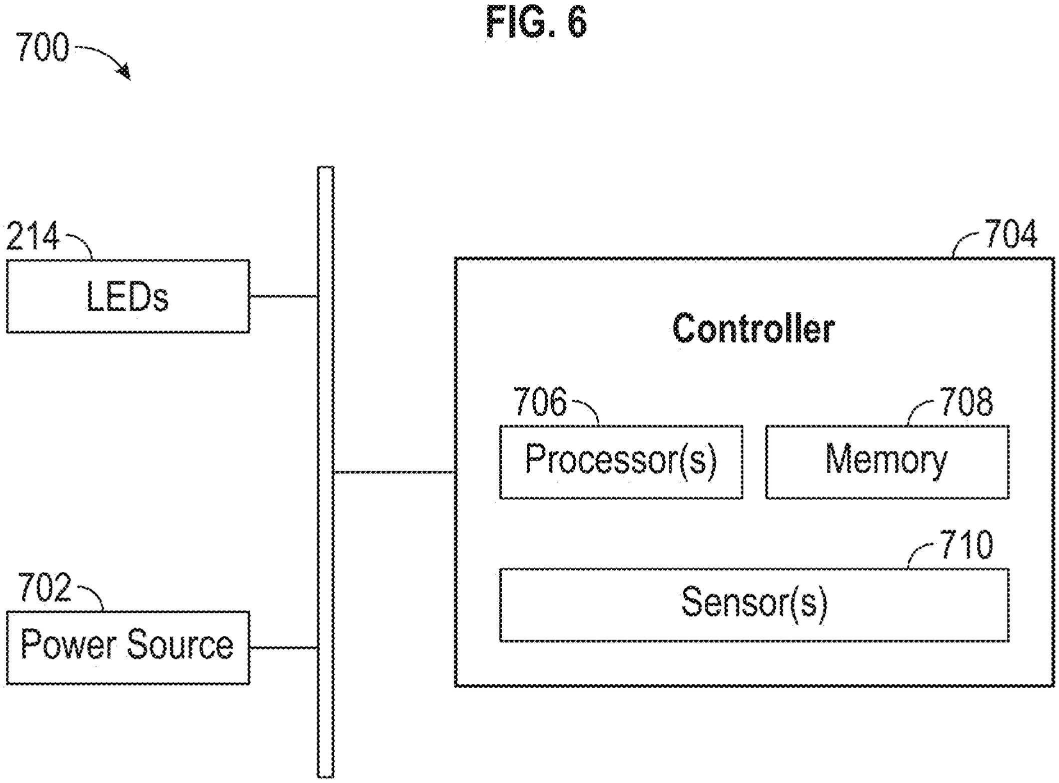
FIG. 7 is a block diagram of a mirror assembly system, according to an exemplary embodiment.

Referring now to FIG. 7, depicted is a perspective view of an electronic mirror system 700. The electronic mirror system 700 may include the mirror assembly 100 described above with reference to FIG. 1-FIG. 6, a power source 702, and a controller 704. As described in greater detail below, the controller 704 may be configured control the LEDs 214 to produce the infinite projected image by the mirror assembly 100.

The electronic mirror system 700 may include at least one power source 702 configured to supply power the LEDs 214. The power source 702 may include vehicle batteries (e.g., batteries which are used to supply power to various other electrical components of the vehicle). In some embodiments, the power source 702 may include a dedicated power source for the electronic mirror system 700 (e.g., dedicated batteries or other power store, which may receive power from various other sources including the vehicle batteries).

The electronic mirror system 700 may include the controller 704 configured to control the LEDs 214 of the mirror assembly 100. The controller 704 may include at least one processor 706 and memory 708. The processor(s) 706 may be or include any device, component, element, or hardware designed or configured to perform the various steps or functions recited herein. For example, the processor(s) 706 may include any number of general-purpose single- or multi-chip processors, digital signal processors (DSP), application specific integrated circuits (ASIC), field programmable gate arrays (FPGA), or other programmable logic device(s), discrete gate or transistor logic, discrete hardware components, or any combination thereof designed or configured to perform the various steps recited herein. In various embodiments, the processor(s) 706 may be a component or element of a vehicle, such as an electronic control unit (ECU), a head unit, or other processors/hardware/computers of the vehicle.

The controller 704 may include one or more sensors 710 configured or arranged to sense various conditions related to the electronic mirror system 700. For example, the sensor(s) 710 may include any color (RBG) sensors, ambient light sensors, motion sensors, proximity sensors, or any combination thereof configured or arranged to sense various conditions recited herein.

In some embodiments, the electronic mirror system 700 may include a sensor 710 configured or arranged to sense various conditions of the electronic mirror system 700. In some embodiments, the sensor 710 could include a motion sensor. The motion sensor may be arranged to sense conditions proximate to the electronic mirror system 700 (e.g., within a cabin of the vehicle). In some embodiments, the sensor 710 could include a proximity sensor. Similarly, the proximity sensor may be arranged to sense conditions proximate to the mirror assembly 100 (e.g., within a cabin of the vehicle). As a result, the mirror assembly 100 may illuminate when motion is detected/perceived/identified nearby (e.g., according to a change in depth/proximity/etc. between the sensor and an object within a field of view of the sensor, motion detected by the sensor, and so forth).

In some embodiments, the electronic mirror system 700 may include multiple sensors 710 which are designed or configured to sense (e.g., either separately or together) various conditions recited herein. As one example, the electronic mirror system 700 may include a first sensor 710 designed or configured to sense motion, and a second sensor 710 designed or configured to sense the brightness of the surrounding environment (with the first subset being different from the second subset). As another example, the electronic mirror system 700 may include first and second sensors 710 which together sense the various metrics of the LEDs in a distributed fashion. As such, unless explicitly indicated otherwise, such as by use of a term such as "a single sensor", the term "one or more sensor(s)" as used herein contemplates and encompasses embodiments in which all of the one or more sensors perform all of the recited steps or features, different sensors separately perform different ones of the steps or features, the same or different sets of two or more sensors work in combination to perform individual steps or features, or any variation thereof. In other words, the use of the term "one or more sensors" may refer to the sensor(s) 710 of the electronic mirror system 700 and/or the sensors of other components of the system 700 described herein.

The controller 704 may be communicably coupled to a power source 702 of the electronic mirror system 700. For example, the controller 704 may be structured or configured to monitor and/or manage LEDs 214 of the system 700. For example, the controller 704, via the one or more processors 706, may be configured to receive motion metrics and activate the LEDs of the electronic mirror system 700. As another example, the controller 704 may additionally be communicably coupled to one or more processors 706 to receive time metrics at which the LEDs 214 have remained activated and switch the LEDS 214 between an ON state to an OFF state to save power as the vehicle is idle.

In some embodiments, the controller 704 may be communicably coupled to an input/output (I/O) device (such as a head unit, a touch screen, and so forth). The controller 704 may be configured to receive various inputs for controlling/managing the LEDs 214 of the system 700. For example, an end user (e.g., an operator or passenger of the vehicle) may be configured to provide various inputs to control a state of the LEDs 214 and, correspondingly, light output by the mirror assembly 100. As one example, the inputs may control an activation or deactivation of the LEDs 214, a brightness of light output the LEDs 214, a color of light output by the LEDs 214, a pattern of light output by the LEDs 214, and so forth. The controller 704 may be configured to receive the inputs to the I/O device, and control the LEDs 214 according to the inputs (e.g., to activate or deactivate the LEDs 214, to change a brightness or color of light produced by the LEDs 214, and so forth).

As a result of the systems and methods described herein, the mirror assembly may promote color mixing and allow adjustments to light intensity from the inclusion of RGB-LEDs and a light guide. The configuration of the mirror assembly may increase homogeneity of the light projected from the mirror assembly. The configuration of the mirror assembly may facilitate the formation of a perceived infinite tunnel as an observer views the projected image. In some embodiments, the mirror assembly may include reflectors to further promote color mixing, increase intensity, and/or increase homogeneity. In some embodiments, the mirror assembly may include designed components with prepared surfaces to be used as reflectors to further promote color mixing, increase intensity, and/or increase homogeneity.

As a result, the mirror assembly may provide versatile lighting applications for taillights, headlights, emblems, and other exterior portions of a vehicle, and interior components of a vehicle including, but not limited to, dashboard panels and center consoles. Additionally, while described in the context of vehicles, it should be understood that the present disclosure has applicability beyond that of vehicle deployments, such as in consumer products, standalone devices, and so forth. Thus, the present disclosure should not be limited to a vehicle setting.

Having now described some illustrative embodiments, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other embodiments or embodiments.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate embodiments consisting of the items listed thereafter exclusively. In one implementation, the systems and methods described herein consist of one, each combination of more than one, or all of the described elements, acts, or components.

Any references to embodiments or elements or acts of the systems and methods herein referred to in the singular can also embrace embodiments including a plurality of these elements, and any references in plural to any implementation or element or act herein can also embrace embodiments including only a single element. References in the singular or plural form are not intended to limit the presently disclosed systems or methods, their components, acts, or elements to single or plural configurations. References to any act or element being based on any information, act or element can include embodiments where the act or element is based at least in part on any information, act, or element.

Any implementation disclosed herein can be combined with any other implementation or embodiment, and references to "an implementation," "some embodiments," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and embodiments disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A mirror assembly, comprising:

a light guide having a first portion extending along a first axis and a second portion extending along a second axis;

one or more light emitting diodes (LEDs) arranged to project light along the first axis, through the first portion of the light guide, and out of the second portion of the light guide;

a diffuser arranged proximate to an outer perimeter of the second portion of the light guide, to diffuse light from the LEDs along a surface of the diffuser, the diffuser at least partially surrounding a first mirrored portion; and a lens comprising a second mirrored portion facing the first mirrored portion, wherein light diffused by the diffuser and reflected by the first mirrored portion and second mirrored portions produces a projected image.

2. The mirror assembly of claim 1, wherein a first distance between the second mirrored portion and the diffuser defines a second distance between rungs of the projected image.

3. The mirror assembly of claim 2, wherein the first distance is proportionally related to the second distance.

4. The mirror assembly of claim 1, wherein the lens comprises an upper surface having an image viewable thereon, wherein the projected image comprises rungs which surround the image.

5. The mirror assembly of claim 1, wherein the diffuser comprises a ring-shaped diffuser, which is arranged along a circumference of the second portion of the light guide.

6. The mirror assembly of claim 1, wherein the first portion comprises a flat surface extending along the first axis, and the second portion comprises a curved surface extending along the second axis.

7. The mirror assembly of claim 1, further comprising a housing configured to enclose the mirror assembly.

8. The mirror assembly of claim 7, wherein the housing comprises an upper housing portion which extends along the second axis beyond the lens.

9. The mirror assembly of claim 8, wherein the upper housing portion has a height that varies about a perimeter of the lens.

10. A method for manufacturing a mirror assembly, the method comprising:

mounting one or more light emitting diodes (LEDs) to a base plate, wherein the LEDs are mounted to project light along a first axis;

positioning the base plate within a housing;

mounting a light guide in the housing, the light guide having a first portion extending along the first axis proximate the LEDs, and a second portion extending along a second axis;

positioning a diffuser proximate to an outer perimeter of the second portion of the light guide, to diffuse light from the LEDs along a surface of the diffuser, the diffuser at least partially surrounding a first mirrored portion; and mounting a lens proximate the diffuser, wherein the lens comprises a second mirrored portion facing the diffuser and the first mirrored portion, wherein light diffused by the diffuser and reflected by the first mirrored portion and the second mirrored portion produces a projected infinite image.

11. The method of claim 10, wherein the diffuser comprises a ring-shaped diffuser, and wherein the diffuser is positioned along a circumference of the second portion of the light guide.

12. A mirror assembly system, comprising:

a mirror assembly comprising:

a light guide having a first portion extending along a first axis and a second portion extending along a second axis;

one or more light emitting diodes (LEDs) arranged to project light along the first axis, through the first portion of the light guide, and out of the second portion of the light guide, a diffuser arranged proximate to an outer perimeter of the second portion of the light guide, to diffuse light from the LEDs along a surface of the diffuser, the diffuser at least partially surrounding a first mirrored portion;

a lens comprising a second mirrored portion facing the first mirrored portion; and a controller configured to control the LEDs to project the light along the first axis, to produce a projected infinite image when the light is diffused by the diffuser and reflected by the first mirrored portion and the second mirrored portion.

13. The mirror assembly system of claim 12, wherein a first distance between the second mirrored portion and the diffuser defines a second distance between rungs of the projected infinite image.

14. The mirror assembly system of claim 13, wherein the first distance is proportionally related to the second distance.

15. The mirror assembly system of claim 12, wherein the lens comprises an upper surface having an image viewable thereon, wherein the projected infinite image comprises rungs which surround the image.

16. The mirror assembly system of claim 12, wherein the diffuser comprises a ring-shaped diffuser, which is arranged along a circumference of the second portion of the light guide.

17. The mirror assembly system of claim 12, wherein the first portion comprises a flat surface extending along the first axis, and the second portion comprises a curved surface extending along the second axis.

18. The mirror assembly system of claim 12, wherein the mirror assembly further comprises a housing configured to enclose the mirror assembly.

19. The mirror assembly system of claim 18, wherein the housing comprises an upper housing portion which extends along the second axis beyond the lens, wherein the upper housing portion has a height that varies about a perimeter of the lens.

20. The mirror assembly system of claim 12, wherein the controller is configured to control at least one of a color, intensity, or switching of the LEDs.

* * * * *